Aug. 19, 1969 ATSUSHI TAJIMA ET AL 3,461,740
COLLAPSIBLE STEERING COLUMN ASSEMBLY
Filed Oct. 4, 1967 5 Sheets-Sheet 1
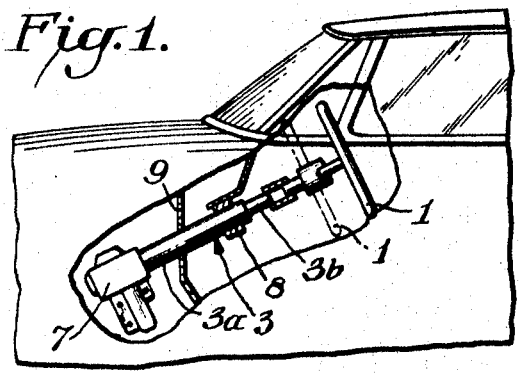
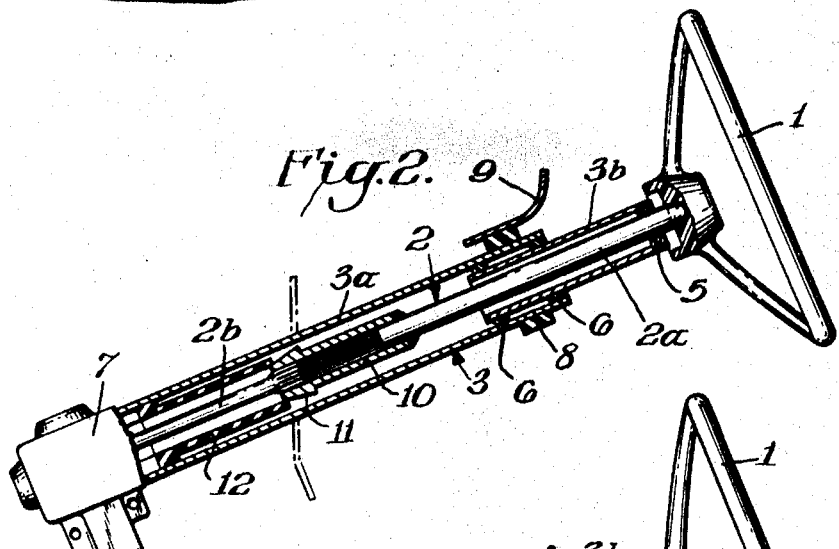
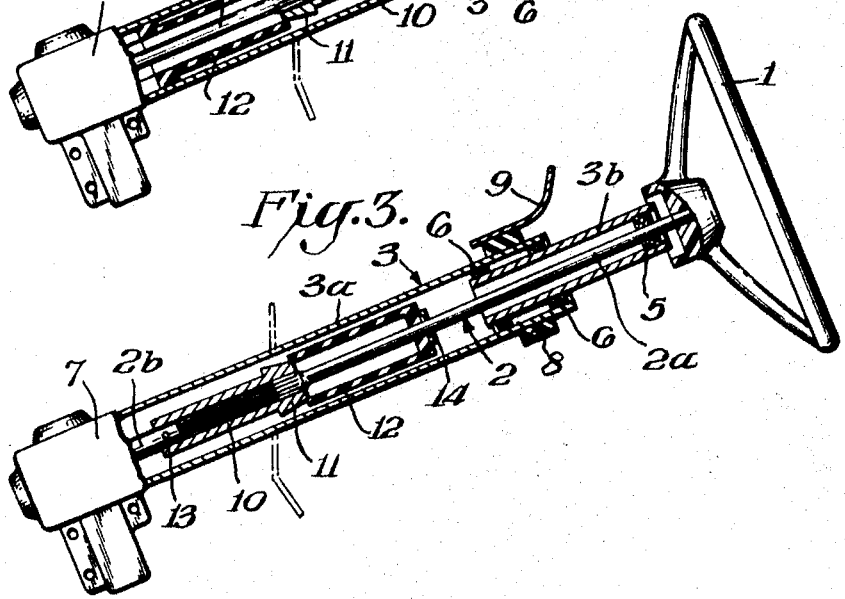

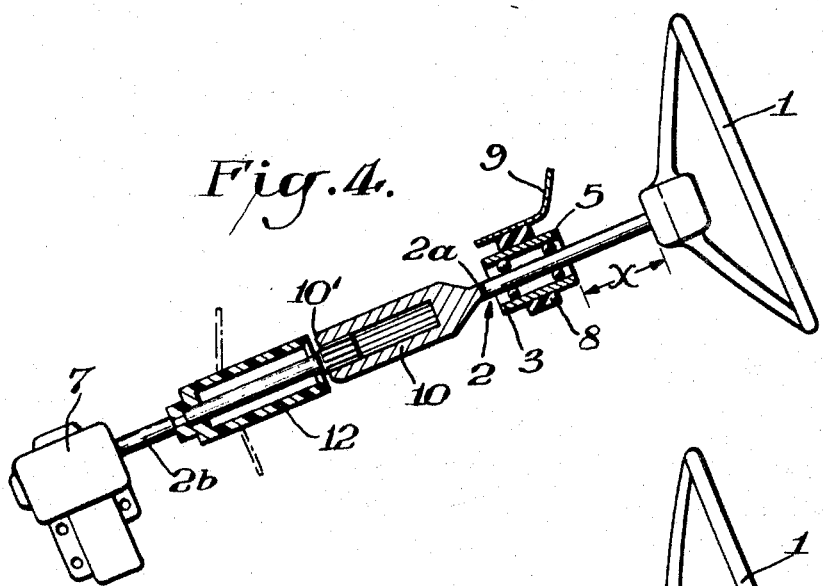
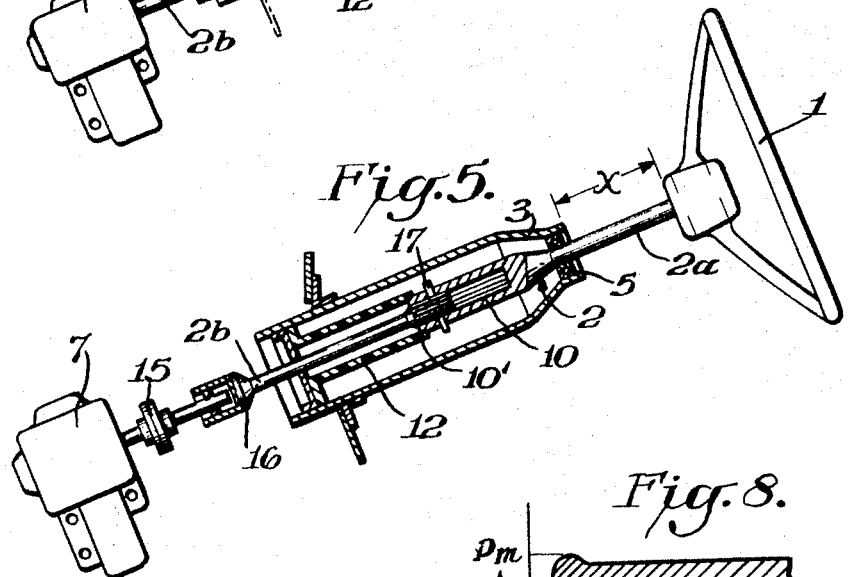
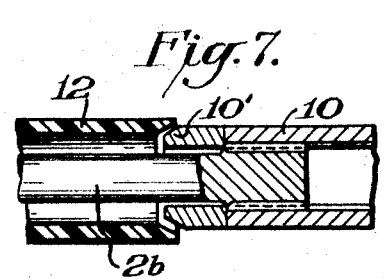
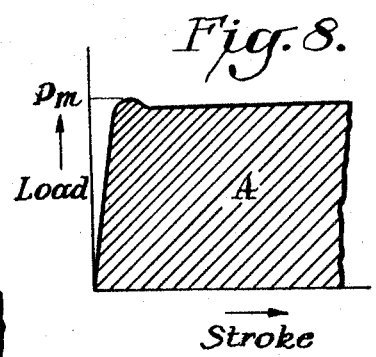

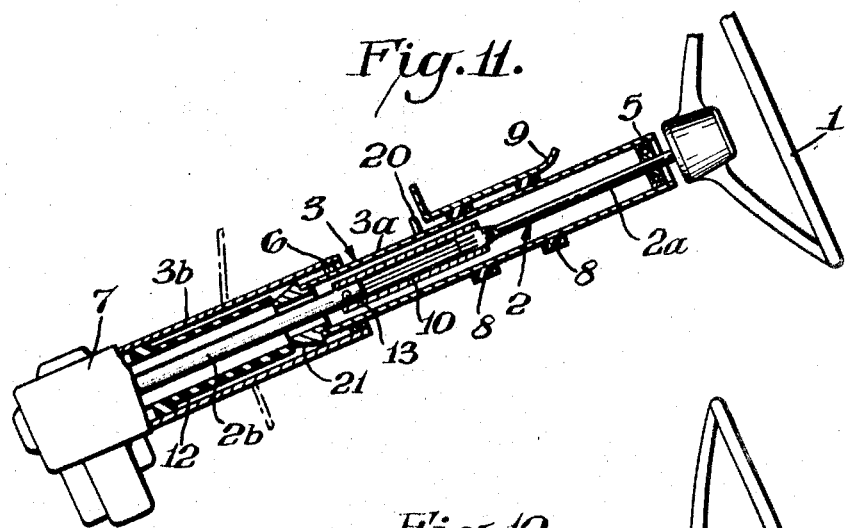
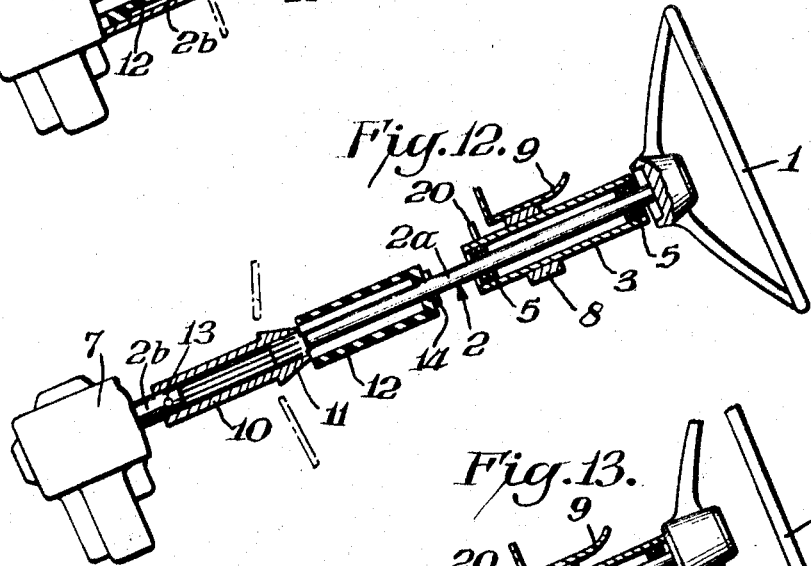
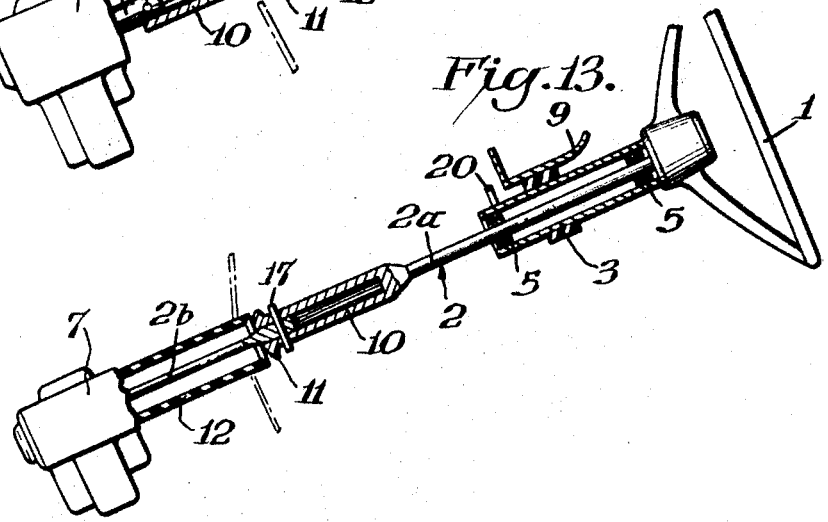

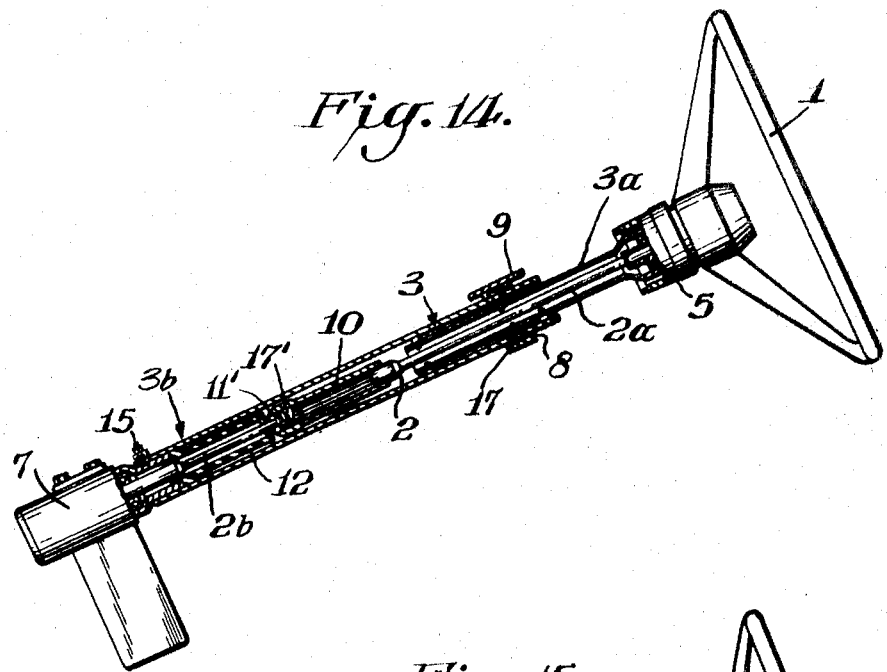
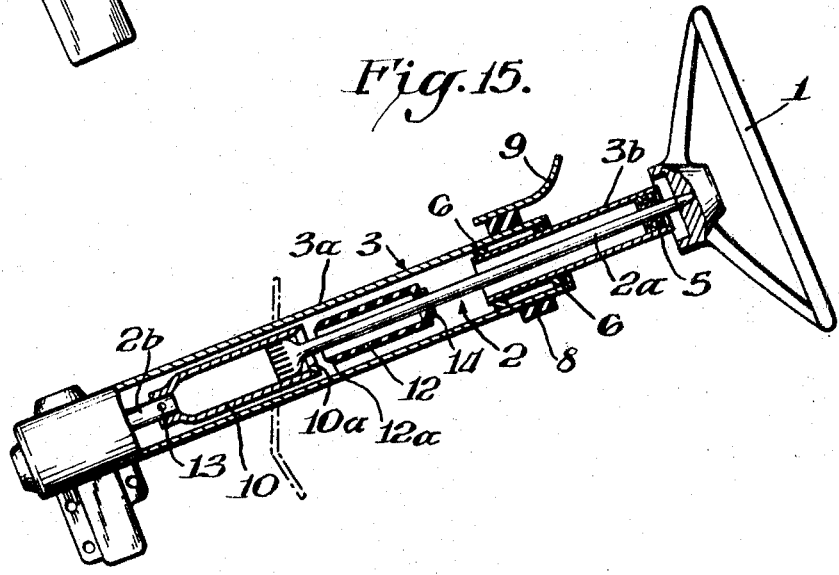

United States Patent Office 3,461,740
Patented Aug. 19, 1969

3,461,740
COLLAPSIBLE STEERING COLUMN ASSEMBLY
Atsushi Tajima and Shigeru Moriya, Toyota, Japan, assignors to Toyota Jidosha Kabushiki Kaisha, Toyota, Japan, a corporation of Japan
Filed Oct. 4, 1967, Ser. No. 672,866
Claims priority, application Japan, Oct. 5, 1966, 41/65,511; Oct. 8, 1966, 41/66,201
Int. Cl. B62d 1/18; B60k 27/00
U.S. Cl. 74—492                                          4 Claims

ABSTRACT OF THE DISCLOSURE

A collapsible column of the type used on motor vehicles is arranged to telescope upon impact thereby eliminating chest injuries to a driver involved in an accident. The steering shaft within the column has upper and lower sections connected by a coupling. In normal operation the sections are adapted to rotate together, but upon the application of an axial force load, such as encountered in a collision, these sections will telescope one within the other. Means for absorbing the energy of such a collision are arranged about the shaft sections and compromise a scyindrical element and an opposite element. The opposite element when thrust into the cylindrical element by the force of impact deforms the latter thereby absorbing the energy generated upon collision.

Background of the invention

In a conventional steering column assembly for a vehicle, the steering shaft attached to the steering wheel and the steering post rotatably supporting the steering shaft therewithin are constructed not to collapse or extend in the axial direction. In a collision should the driver be thrown forwardly due to inertia of the vehicle coming to a sudden stop, his chest is frequently crushed by the rigid steering wheel and column assembly resulting in a serious injury or costing him his life in the worst case.

If the steering column assembly is allowed to displace axially in case of a collision while absorbing energy of such collision in a suitably way, the driver's forward motion would not impale him upon the steering column.

However desirable, this might be for the safety of the driver often space limitations within a vehicle dictate a limited amount of axial movement by the column resulting in a concomitant limitation of the amount of energy absorbed by this movement. The balance of the impact energy is therefore transferred through the column to the driver resulting in serious injury. It therefore becomes imperative to have high energy absorptive means to absorb this impact energy yet be sufficiently small to fit within the confines of the column.

Summary of the invention

The present invention relates to an improved collapsible steering column assembly having axially displaceable elements, and more particularly, to an improved energy absorbing means built in said steering column assembly for absorbing energy of axial displacement of said elements upon an application of an axial force load on said steering column assembly.

In the basic embodiment of collapsible steering column assembly for vehicle according to the present invention, the steering shaft is divided into an upper section and a lower section which are so connected by a coupling to each other that they are normally allowed to rotate together, but upon an application of an axial force load on said steering column assembly they are caused to displace axially relative to each other. The energy absorbing means in the column assembly includes a cylindrical element constructed of tough deformable material and an opposite element disposed adjacent and opposite to one end of said cylindrical element and having a contour adapted to enlarge or reduce the diameter of said cylindrical element as these elements axially displace toward each other. This energy absorbing means can effectively absorb the maximum collision energy with a very short stroke by virtue of the unique construction and arrangement of the simple cylindrical and opposite elements.

Therefore, one object of the present invention is to provide a collapsible steering column assembly which has a novel and improved energy absorbing element built therewithin.

Another object of the present invention is to provide an energy absorbing means which is able to absorb a maximum collision energy with a minimum load and a short stroke.

A further object of the present invention is to provide an energy absorbing element having a simple construction which includes a cylindrical element and an opposite element which are simply built within the steering column assembly and adapted to effectively absorb energy of vehicle collision.

A still further object of the present invention is to provide a novel and improved steering column assembly for vehicle in which a stop is provided on the post for allowing the post to axially displace by a substantial distance in one direction, but to restrict axial displacement of the post in the other direction.

The above and other objects and advantages of the present invention will be more readily apparent to those skilled in the art from the following description when read in connection with the accompanying drawings in which:

Brief description of the drawings

FIG. 1 is a fragmentary side elevational view of the driver's compartment in the body of a vehicle in which a preferred form of collapsible steering column assembly according to the present invention is mounted;

FIG. 2 is an enlarged side elevational view in partial section of said collapsible steering column assembly of FIG. 1 showing the steering column as mounted in the body of a vehicle;

FIG. 3 is a side elevational view in partial section of a modified form of collapsible steering column assembly according to the present invention showing the steering column as mounted in the body of a vehicle;

FIGS. 4 through 6 are side elevational views in partial section of further modified forms of collapsible steering column assemblies according to the present invention showing each of the steering columns as mounted in the body of a vehicle;

FIG. 7 is a fragmentary longitudinally sectional view illustrating one type of energy absorbing arrangement between the sleeve-like coupling and cylindrical member;

FIG. 8 is a diagrammatic view illustrating the relation between applied load and energy absorbing stroke in each of various collapsible steering column assemblies according to the present invention;

FIG. 11 is a side elevational view in partial section of a further modified form of collapsible steering column assembly according to the present invention showing the steering column as mounted in the body of a vehicle;

FIGS. 12 through 13 are side elevational views in partial section of further modified forms of collapsible steering column assemblies according to the present invention showing the steering column as mounted in the body of a vehicle;

FIG. 14 is a side elevational view in partial section of a further modified form of collapsible steering column assembly according to the present invention showing the steering column as mounted in the body of a vehicle; and FIG. 15 is a side elevational view in partial section of a further modified form of collapsible steering column assembly having a hollow member which is inwardly deformed by means of a coupling.

Figure 6:
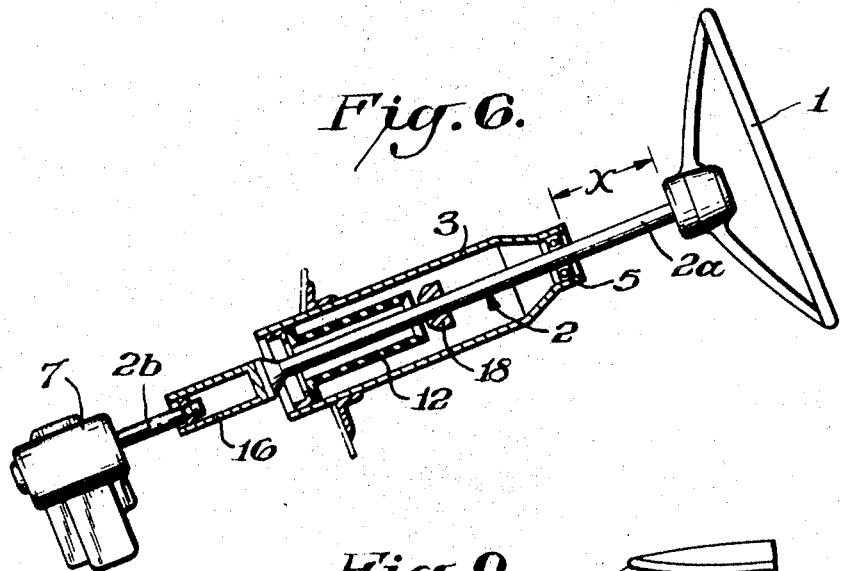

In order to simplify illustration of embodiments, the identical and corresponding parts of several embodiments are indicated with the same reference numerals throughout various figures of the drawings and in order to simplify the disclosure of the invention, repeating explanation on the construction and arrangement of the identical and corresponding component parts of the embodiments are eliminated.

Description of the preferred embodiments

Referring now to the drawings and more particularly, to FIGS. 1 and 2 thereof in which a preferred form of collapsible steering column assembly according to the present invention is shown as mounted in the body of a vehicle. The collapsible steering column assembly generally comprises an outer mast or post 3 rotatably supporting a telescopic steering shaft 2 therewithin having a steering wheel 1 secured to one or upper end thereof. The steering shaft 2 is rotatably supported adjacent the upper end thereof by means of bearings 5. The outer post 3 consists of a large diameter lower tubular member 3a and a smaller diameter or upper tubular member 3b which are connected to each other at their opposite or adjacent end portions in a partially overlapping relation with a pair of axially spaced annular elastic bushings 6 interposed therebetween. The bushings 6 may be formed of rubber, rubberlike material or synthetic resin. The bushings are adapted to normally hold the larger and smaller diameter tubular members 3a and 3b against axial displacement relative to each other, but in the event of application of an axial force on the steering column in either direction such as in case of vehicle collision, the bushings allow the larger and smaller diameter tubular members 3a and 3b to axially displace relative to each other while absobing the energy of such axial displacement. This imparts controlled resistance to the collapse of the outer post 3. The outer post 3 and more particularly, the larger diameter tubular member 3a thereof is supported on the bottom of the instrument panel structure 9 of the body of a vehicle by means of a clamp 8 which is in turn secured to the panel structure. The lower end of the larger diameter tubular member 3a of the outer post 3 extends through the fire wall of the vehicle body into the steering gear box 7 where it is rigidly supported.

The steering shaft 2 consists of an upper shaft section 2a having the steering wheel 1 secured to the upper end thereof and a lower shaft section 2b which also extends into the steering gear box 7. The upper and lower shaft sections 2a and 2b are connected to each other at their adjacent end portions by means of a sleeve-like coupling 10. The lower end portion of the upper shaft section 2a is secured to the inner periphery of the coupling 10 by welding or other suitable means. The upper end portion of the lower shaft section 2b is provided on its outer periphery with a plurality of longitudinal splines which engage in mating grooves of the coupling 10. Under the normal operation of the steering column the upper and lower shaft sections 2a and 2b and coupling 10 move in unison in the rotational direction of the steering shaft 2, but in the event of application of an axial force on the steering column in either direction the lower shaft section and coupling may displace relative to each other in the axial direction.

The lower end of the coupling 10 has an enlarged frusto-conical portion 11. A hollow cylindrical member 12 is disposed around the lower end portion of the lower shaft section 2b in a circumferentially spaced relation thereto and has an outwardly and radially extending flanged portion at the lower end which is secured to the inner periphery of the lower or larger diameter tubular member 3a by any suitable means. The cylindrical member 12 is constructed of tough deformable material such as synthetic resins, for example. The hollow cylindrical member 12 has an inner diameter slightly smaller than the lower end of the enlarged portion 11 of coupling 10.

FIGS. 3 through 6 illustrate various modified forms of steering column assemblies according to the present invention. Referring first to FIG. 3, it will be seen that the arrangement of the hollow cylindrical member 12 and coupling 10 is reversed and the upper end portion of the lower shaft section 2b is pinned to the lower end portion of the coupling 10 at 13. The lower end portion of the upper shaft section 2a extends through the hollow cylindrical member 12 and is in spline engagement with the upper end portion of the coupling 10. The hollow cylindrical member of element 12 is disposed around the lower end portion of the upper shaft section 2a in a circumferentially spaced relation thereto and is held at the upper end thereof in place on the upper shaft section by means of snap ring 14. The construction and arrangement of the other component parts are identical with those of the corresponding parts of the first embodiment.

In the embodiment of FIG. 4, the outer mast of post 3 which rotatably supports the steering shaft 2 therewithin by means of bearings 5 comprises a single shorter tubular member and surrounds only a portion of the steering shaft 2, and more particularly, a portion of the upper shaft section 2a and is supported on the bottom of the instrument panel structure 9 of the vehicle body by means of the clamp 8 which is in turn secured to the panel structure. The outer post 3 is normally positioned spaced from the lower end of the steering wheel 1 by a distance, $x$, so that the event of application of an axial force the steering wheel 1 may be allowed to collapse this predetermined distance. Furthermore, in the embodiment of FIG. 4 the coupling 10 is not provided with the enlarged portion as mentioned in connection with the embodiments of FIGS. 1 through 3, but instead the lower end edge of the coupling 10 is bevelled as shown at 10' while the upper end portion thereof is tapered and rigidly connected to the lower end of the upper shaft section 2a. The hollow cylindrical member 12 is formed as having an inner diameter slightly smaller than the outer diameter of the coupling 10.

With the construction and arrangement of the coupling 10 and hollow cylindrical member 12 of the embodiment of FIG. 4, these component parts function in the same manner as the corresponding parts of the preceding embodiments. However, it should be understood that the coupling 10 may be formed as having a uniform diameter throughout its length and a separate member' 10' having a bevelled forward edge may be attached at one end as shown in FIG. 7 whereby the operation for shaping the coupling 10 may be greatly facilitated. In this case, the uniform diameter coupling 10 and separate member 10' should be connected to each other in such a way that these parts may be moved in unison at least in the collapsing displacement of the upper shaft section 2a of the steering shaft 2. The coupling 10 and separate member 10' may be welded together after separate forming thereof, for example.

In the embodiment of FIG. 5, the outer mast or post 3 which rotatably supports the steering shaft 2 therewithin by means of bearings 5 comprises a single tubular member and encircles only a portion of the steering shaft 2 as mentioned just above in connection with the embodiment of FIG. 4. However, the outer post 3 of FIG. 5 is substantially longer than the corresponding part of FIG. 4 and accordingly, encircles a longer portion of the steering shaft 2. The outer post of FIG. 5 is also different from the outer post of FIG. 4 in the fact that the upper end of the post where the bearings 5 rotatably support the steering shaft gradually reduced in diameter. Also in the embodiment of FIG. 5 there is provided the clearance, $x$, between the upper end of the outer post 3 and the lower end of the steering wheel 1 for the same purpose as described in connection with the embodiment of FIG. 4. The outer post 3 is secured adjacent the lower end to the fire wall of the vehicle body in front of the driver's compartment (not shown) by means of the conventional securing member. A shearable transverse synthetic resin pin 17 extends through the aligned bores formed in the lower shaft section 2b and coupling 10 in the spline connection between the lower shaft section and coupling. The synthetic resin pin 17 may be preformed and then inserted transversely of the spline connection or synthetic resin may be directly injected and moulded into the aligned bores in the shaft section and coupling. A pair of axially spaced different types of universal joints 15 and 16 are mounted on the lower shaft section 2b at different intermediate points between the opposite ends of the lower shaft section 2b so that the frame to which the steering gear box 7 is secured may be allowed to move relative to the body of the vehicle. The construction and arrangement of the hollow cylindrical member or element 12 is substantially the same as that of the embodiment of FIGS. 1 and 2.

In the embodiment of FIG. 6, the universal joint 15 in the embodiment of FIG. 5 is eliminated and only the other universal joint 16 is employed. The universal joint 16 of FIG. 6 is somewhat different from that of FIG. 5 in that the joint is so constructed and arranged that the joint 16 connects between the opposite end portions of the two shaft sections 2a and 2b of the steering shaft 2 in an axially spaced relation so as to allow the two sections to axially displace relative to each other upon application of an axial force on the steering column in either direction as well as relative displacement between the frame of the steering gear box and the vehicle body. And more particularly, the universal joint 16 has its own primary function for allowing any angular displacement of the shaft 2 as well as the function of the sleevelike coupling 10 in the preceding embodiments so that the coupling 10 necessary in the preceding embodiment may be eliminated. Furthermore, in this embodiment, an annular member 18 having a bevelled lower end is fixedly mounted on the upper shaft section 2a, which rotates with the joint, in a point between the opposite ends of the upper shaft section by means of welding, for example. The hollow cylindrical member or element 12 which is substantially the same as those in the embodiments of FIGS. 1, 2, 5 and 6 is secured to the inner periphery of the outer post 3 in a position opposing the adjacent universal joint 16.

In the above construction and arrangement of each of the foregoing embodiments, in the event of collision of the vehicle if the driver's chest is thrust forward against the steering wheel 1 the upper shaft section 2a of the steering shaft 2 will collapse or axially displace toward the lower shaft section 2b thus absorbing much of the impact force which would normally be transmitted to the driver. For example, in FIGS. 1 and 2 in the event of collision of the vehicle, the collapsing steering wheel 1 pushes the upper shaft section 2a of the steering shaft 2 downwards together with the sleeve-like coupling 10 which is secured to the lower end of the upper shaft section 2a so as to cause the coupling to sharply abut against and force its way into the hollow cylindrical member 12 thus causing the cylindrical member 12 to deform or bulge outwardly. In this case, by both the outward bulging or deformation of the hollow cylindrical member 12 and the frictional sliding displacement of the outer periphery of the enlarged portion 11 of the coupling 10 into the hollow cylindrical member 12, energy of such axial collapse or displacement of the steering shaft 2 is absorbed. This, even when the driver's chest is thrust against the steering wheel 1 as mentioned above, the steering wheel 1 will collapse smoothly in the axially downward direction thus absorbing the energy of the collision and reducing injury to the driver.

In the embodiment of FIG. 3, when the driver's chest is thrust against the steering wheel 1 in the event of vehicle collision, the upper shaft section 2a of the steering shaft 2 to which the steering wheel 1 is secured collapses or axially displaces toward the lower shaft section 2b. As the upper shaft section 2a is collapsing the hollow cylindrical member 12 which is secured to the shaft section 2a by means of the snap ring 14 is also caused to axially displace together with the shaft section while being bulged outwardly or deformed by its frictionally sliding displacement over the frusto-conical enlarged portion 11 of the coupling 10. Thus, in the same manner as metnioned in connection with the preceding embodiments, energy of such collapse of the steering wheel 1 may be easily absorbed. In either of the embodiments of FIGS. 1, 2 and 3, the upper or smaller diameter tubular member 3b of the outer post 3 is, of course, caused to collapse or axially displace toward the lower or larger diameter tubular member 3a at the same time when the upper shaft section 2a collapses in the manner as mentioned above.

In either of the embodiments of FIGS. 4 and 5, as mentioned above, since the outer mast or post 3 encircles only a portion of the steering shaft 2, such collapsing displacement of the outer post 3 as mentioned in connection with the embodiments of FIGS. 1 through 3 will not take place, but the upper shaft section 2a of the steering shaft 2 may collapse or axially displace toward the lower shaft section 2b in the same manner as in the preceding embodiments and the coupling 10 which is secured to the upper shaft section 2a and displaces together with the shaft section forces its way into the hollow cylindrical member 12 and cause the member to bulge outwardly or deform in the event of vehicle collision so as to cause the steering wheel 1 to collapse as mentioned above. In the embodiment of FIG. 5 in which the shearable synthetic resin pin 17 extends transversely of the spline connection between the lower shaft section 2b and coupling 10, when the upper shaft section 2a collapses, such collapse of the upper shaft section 2a shears the pin 17 which absorbs an initial portion of the energy of such collision and the remaining energy portion is absorbed by the outwardly bulging deforming action of the cylindrical member 12 due to the downwardly axial displacement of the coupling 10 which is rigidly secured to the upper shaft section 2a. Accordingly, the embodiment of FIG. 5 has a greater energy absorbing capability than any of the above-mentioned embodiments.

FIG. 8 diagrammatically illustrates a typical relation between a load which represents a specific collision energy amount and a predetermined distance of stroke for energy absorbing. In FIG. 8, the cross-hatched area, A, represents an amount of energy absorbed and $Pm$ represents a maximum load. From this FIG. 8, it will be understood that in order to meet the requirements for increasing the value for the area A as much as possible and reducing the value for $Pm$ as much as possible, the energy absorbing by outwardly deforming or bulging of the hollow cylindrical member according to the present invention is quite effective. The setting of the various values for the energy absorbing requirements may be suitably selected depending upon the size of any specific steering column assembly as well as the type, wall thickness and expansion capability of the hollow cylindrical member 12.

Figure 9:
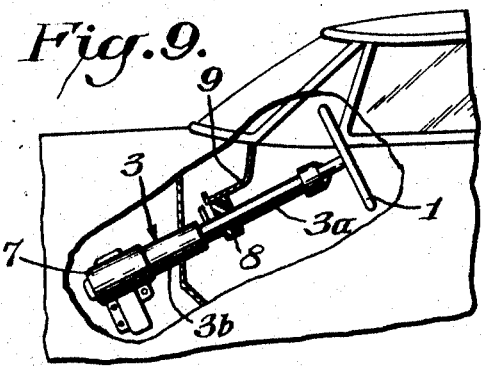
FIG. 9 is a fragmentary side elevational view of the driver's compartment in the body of a vehicle in which a further modified form of collapsible steering column assembly according to the present invention is mounted.
Figure 10:
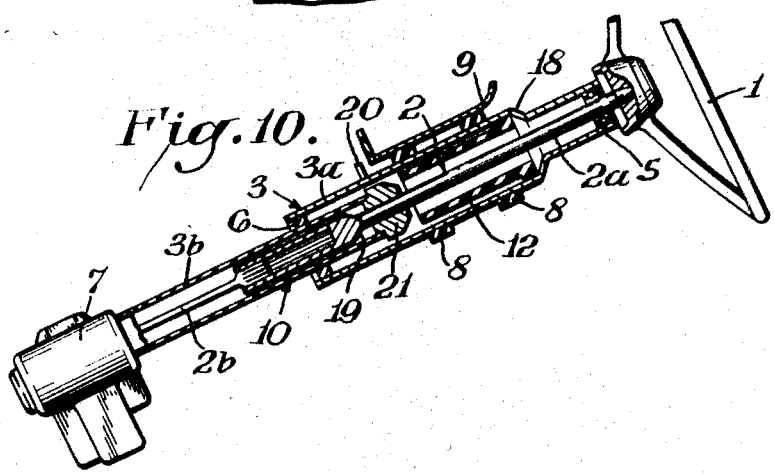
FIG. 10 is an enlarged side elevational view in partial section of said collapsible steering column assembly of FIG. 9 showing the steering column as mounted in the body of a vehicle.

FIGS. 9 and 10 illustrate a further modified form of steering column assembly according to the present invention. As more clearly shown in FIG. 10, the steering column assembly generally comprises an outer mast or post 3 which rotatably supports a telescopic steering shaft 2 having a steering wheel 1 secured to one end and therewithin by means of bearings 5 at the reduced diameter upper end portion of the outer post. The outer post 3 consists of an upper or larger diameter tubular member 3a having the reduced diameter upper end portion where the bearings 5 rotatably support the steering shaft 2, and a lower or smaller diameter tubular member 3b. The adjacent or opposite end portions of the larger and smaller diameter tubular members 3a and 3b are connected to each other in a partially overlapping relation with an elastic bushing 6 formed of rubber or synthetic resin interposed therebetween. In the even of a collision, the larger diameter tubular member 3a is allowed to axially displace in the downward direction toward the smaller diameter tubular member 3b. The upper tubular member 3a of the outer post 3 is supported adjacent the upper end thereof on the bottom of the instrument panel structure 9 of the vehicle body by means of a pair of axially spaced clamps 8 in which bushings formed of synthetic resin or rubber (not shown) are disposed. The upper tubular member 3b is provided in its outer periphery with a stop or engaging piece 20 in such a position that the stop may abut against the rear surface of the instrument panel structure 9 in the course of the upward displacement of the upper tubular member 3a away from the lower tubular member 3b. Thus, it will be understood that if a collision is of such a great degree as to badly damage and push the steering gear box 7 upwardly, upward displacement of the outer mast will be restrained by abutment of the stop 20 against the instrument panel. Collision energy may be absorbed by the bulging or outward deforming of the cylindrical member 12 due to the frictional slide movement of a tip member 21 which will be explained hereinafter into the cylindrical member 12.

The connection arrangement between the upper and lower shaft sections 2a and 2b of the steering shaft 2 is such that the lower end portion of the upper shaft section 2a is fit within the adjacent end portion of the coupling 10 and welded thereto as indicated at 19 while the outer periphery of the upper end portion of the lower shaft section 2b is splined for receiving the longitudinal ridges formed in the inner periphery of the adjacent end portion of the coupling 10.

The smaller diameter or lower tubular member 3b of the outer post 3 has its lower end portion secured to the steering gear box 7 and is provided at the upper end with a frusto-conical tip member 21 with a portion thereof inserted within the lower tubular member 3b. A hollow cylindrical member 12 having an inner diameter slightly smaller than the outer diameter of the reduced diameter fore end of the frusto-conical tip member or opposite element 21 is disposed within the upper tubular member 3a with the upper end abutting against the inner surface of the shoulder 18 formed adjacent the upper end of the upper tubular member 3a.

FIGS. 11 through 13 illustrate various modifications of the embodiment of FIGS. 9 and 10 respectively.

Referring first to FIG. 11, the lower shaft section 2b of the steering shaft 2 is secured to the lower end of the coupling 10 by means of a transverse pin 13 extending through the aligned bores in the opposite end portions of the lower shaft section 2b and coupling 10. The outer post 3 also consists of two tubular members 3a and 3b as in the case of the embodiment of FIG. 10, but in this embodiment the arrangement of these two tubular members is reversed. The frusto-conical tip member 21 is attached to the lower end of the upper tubular member 3a with a portion thereof inserted within the upper tubular member 3a, and the hollow cylindrical member 12 is disposed within the lower tubular member 3b. The upper tubular member 3a is provided with the stop 20 which is identical with the stop 20 of the embodiment of FIGS. 9 and 10.

In the embodiment of FIG. 12, the outer mast or post 3 comprises a single tubular member and shorter in length and accordingly, encircles only a portion of the steering shaft 2. The outer post 3 is similarly provided with the stop 20 in its outer periphery for the purpose as explained in the embodiments of FIGS. 9 to 11. In this embodiment, the sleeve-like coupling 10 which connects the upper and lower shaft sections 2a and 2b is formed adjacent the upper end thereof with an outwardly enlarged integral portion or opposite element 11 having the diameter which reduces toward the fore end. A snap ring 14 is provided on the upper shaft section 2a adjacent the upper end of the member 12 so as to restrict axial displacement of the cylindrical member 12 in the upward direction. As explained hereinabove in connection with FIG. 7, the integral bulged portion 11 may be eliminated from the sleeve-like coupling 10 and instead a separate frustoconical member 10' is preformed and later connected to the coupling 10 by means of welding, for example.

Also in the embodiment of FIG. 13, in the same way as in the embodiment of FIG. 12, the outer mast or post 3 comprises a single tubular member and encircles only a portion of the upper shaft section 2a of the steering shaft 2. In this embodiment, the upper shaft section 2a and sleeve-like coupling 10 are integrally formed as a single member and the lower shaft section 2b is in spline engagement with the other end portion of the coupling 10 with a transverse synthetic resin pin 17 extending through the aligned bores in the adjacent end portions of the lower shaft section 2b and coupling 10 as explained in connection with the embodiment of FIG. 5.

With the above construction and arrangement of each of the embodiments of FIGS. 9 through 13, upon impact the upper shaft section 2a to which the steering wheel 1 is secured is caused to collapse or axially displace toward the lower shaft section 2b. As explained above, the outward bulging of the cylindrical member 12 and frictional displacement of the cylindrical member over the tip member 11 absorbs the energy of such axial displacement of the upper shaft section 2a.

In a collision, if the steering gear box 7 is pushed upwards, the upper or larger diameter tubular member 3a will be restricted by the abutment of the stop 20 against the rear surface of the instrument panel structure 9 of the vehicle body, and the tip member 21 attached to the upper end of the lower tubular member 3b will axially displace upwardly so as to cause the cylindrical member 12 which is held against axial displacement by the shoulder 18 in the upper tubular member 3a to deform or bulge outwardly. Thus, if the collision is so serious that the steering gear box is pushed upwardly the force causing such upward axial movement will be absorbed within the column and not transmitted to the driver.

In the embodiments of FIGS. 12 and 13, the outer mast or post 3 comprises a single tubular member and the sleeve-like coupling 10 is formed with the integral bulged portion 11 or integral flanged portion 11', but in either of these two types of embodiments, as the upper and lower steering shaft sections 2a and 2b axially displace relative to each other, the hollow cylindrical member 12 is deformed or bulged outwardly thereby to absorb energy of vehicle collision.

In the embodiment of FIG. 13 in which the synthetic resin pin 17 extends transversely of the spline connection between the coupling 10 and lower shaft section 2b, when the upper shaft section 2a collapses or axially displaces toward the lower shaft section 2b, such axial displacement of the upper shaft section 2a inevitably shears the pin 17 thereby absorbing the initial energy of collision, the remaining portion of the collision energy being absorbed by the deforming or outwardly bulging of the hollow cylindrical member 12 by the action of the flanged portion 11′ of the coupling 10. Thus, the embodiment provided with the shearing pin 17 can absorb more energy than the other embodiments in which such a pin 17 is not provided.

In the embodiment of FIG. 14, the outer member 3 comprises an upper or smaller diameter tubular member 3a and a lower or larger diameter tubular member 3b in a partially overlapping relation. These upper and lower tubular members 3a and 3b are normally held against relative movement to each other by means of synthetic resin transverse shearing pins 17 which extend through aligned bores formed in the overlapping portion between the upper and lower tubular members 3a and 3b. However, when an axial load is applied on the steering assembly, these upper and lower tubular members 3a and 3b are allowed to axially displace toward to or away from each other by the shearing of the synthetic shearing pins 17. The steering shaft 2 of the embodiment of FIG. 14 is supported in the manner as mentioned above and also comprises an upper shaft section 2a and a lower shaft section 2b which is connected to the upper shaft section 2a by any suitable means. A sleeve-like coupling 10 is disposed on the upper portion of the lower shaft section 2b and has a downwardly or rearwardly tapered portion 11′. A synthetic resin transverse shearing pin 17 extends through aligned bores formed in the coupling 10 and lower shaft section 2b near the lower end of the coupling so that the coupling and lower shaft section are normally held against relative displacement to each other, but when an axial load is applied on the steering column assembly the coupling and lower shaft section are allowed to axially displace toward or away from each other by the shearing of the resin pin 17′. A cylindrical member 12 is disposed on the lower end portion of the lower shaft section 2b opposite to the sleeve-like coupling 10 in a position in which the cylindrical member 12 receives portion of the adjacent tapered lower end 11′ of the coupling 10. The inner peripherial surface at the upper or adjacent end of the cylindrical member 12 is chamfered corresponding to the configuration of the tapered end 11′ of the coupling. With the above arrangement of the coupling and cylindrical member in the embodiment of FIG. 14, when an axial load is applied in either direction on the steering column assembly of this embodiment and the collapsible elements of the column assembly are allowed to displace axially due to the shearing of the pins 17, the sleeve-like coupling 10 is forced into the deformable cylindrical member 12 so as to cause the cylindrical member to deform or bulge outwardly whereby the stress caused by the axial load can be effectively absorbed.

In the illustrated embodiments, it is contemplated that the energy absorbing action may take place by outwardly deforming or bulging of the hollow cylindrical member 12 by means of the coupling 10, but the same energy absorbing action may also be obtained by reversing the energy absorbing arrangement, that is, by causing the hollow cylindrical member 12 to radially and inwardly deform or to reduce its diameter. In the latter case, it will be, of course, understood that the shape and arrangement of the cylindrical member or element and opposite element such as the bulged portion, bevelled portion, separate mmeber and tip member should be changed so that the opposite element may frictionally slide over the cylindrical member.

FIG. 15 illustrates a modified form of collapsible steering column in the latter case. In the embodiment of FIG. 15, which indicates the same numbers for members or positions corresponding to the previous embodiments, the lower end portion of the upper shaft section 2a extends through the hollow cylindrical member 12 and is in spline engagement with the upper end portion of the coupling 10 in the same manner as in cases of the previous embodiments. The hollow cylindrical member 12 is provided with a taper 12a on the outer periphery of the lower end thereof. The coupling 10 provided with a taper 10a on the inner periphery of the upper end thereof. Said taper 12a of the hollow member 12 and said taper 10a of the coupling 10 are so placed opposite that the hollow member may be forced into the coupling. When the steering column assembly is collapsed in the axial direction, the hollow member is forced to run into the coupling and is radially and inwardly deformed or reduced its diameter. Such an arrangement may be adopted on the post of collapsible steering column. The arrangement in the latter case of the embodiments of the invention as described will not depart from the spirit of the present invention and may be within the scope of the present invention as set forth in the appended claims.

It should be also understood that in the illustrated embodiments, the upper and lower steering shaft sections are shown as being connected by the sleeve-like coupling which engages either one shaft section in the conventional spline means, but such connecting means may be replaced by any other conventional connecting means suitable for the purpase without departing from the spirit of the present invention.

From the foregoing. it will be understood that the present invention provides a practically useful safety steering column assembly with a quite simple construction which can protect the driver from any hazards due to vehicle collision or at least minimize such hazards, if any.

We claim:
1. A collapsible steering column assembly comprising a steering shaft having an upper section and a lower section, coupling means for connecting said upper and lower sections in fixed rotative relationship to each other and in axially telescoping relationship to each other, a post surrounding at least some part of said shaft intermediate its ends to rotatively support said steering shaft, and energy absorbing means comprising a deformable cylindrical element of substantially uniform diameter throughout connected for axial movement with one section of said shaft, and a rigid element slightly larger in cross section than the deformable cylindrical element connected for axial movement with the other section of said shaft toward and into said cylindrical element whereby when said shaft telescopes under impact the cylindrical element is deformed along its length in shock absorbing fashion by said enlarged element.

2. The collapsible steering column assembly as in claim 1, wherein said rigid element is frusto-conical.

3. The collapsible steering column assembly as in claim 1, wherein the cylindrical element is made of a tough, deformable synthetic resin.

4. The collapsible steering column assembly as in claim 1, wherein said rigid element is mounted upon said coupling means.

References Cited

UNITED STATES PATENTS

| 2,852,956 | 9/1958 | May | 74—493 |
|---|---|---|---|
| 3,181,821 | 5/1965 | Webb | 188—1 |
| 3,262,332 | 7/1966 | Wight | 74—493 |
| 3,373,629 | 3/1968 | Wight et al. | 74—492 |
| 3,394,612 | 7/1968 | Bogosoff et al. | 74—492 |

MILTON KAUFMAN, Primary Examiner

U.S. Cl.X.R.

180—78; 188—1; 280—87